(12) United States Patent
Kakadjian et al.

(10) Patent No.: US 8,138,124 B2
(45) Date of Patent: Mar. 20, 2012

(54) DRILLING FLUID WITH CIRCULATION LOSS REDUCING ADDITIVE PACKAGE

(75) Inventors: Sarkis Kakadjian, San Antonio (VE); Jacques Reinaldo Gabay, Caracas (VE); Gerardo Alonso Sanchez, Los Teques (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/535,854

(22) Filed: Aug. 5, 2009

(65) Prior Publication Data

US 2009/0291862 A1 Nov. 26, 2009

Related U.S. Application Data

(63) Continuation of application No. 10/342,852, filed on Jan. 15, 2003, now abandoned.

(51) Int. Cl.
*C09K 8/10* (2006.01)
*E21B 7/00* (2006.01)

(52) U.S. Cl. ............ 507/112; 175/65; 175/72; 507/111; 507/113; 507/211; 507/212; 507/215; 507/216

(58) Field of Classification Search .................. 507/112, 507/111, 113, 211, 212, 214, 215, 216; 175/65, 175/72
See application file for complete search history.

(56) References Cited

U.S. PATENT DOCUMENTS

| | | | |
|---|---|---|---|
| 3,852,201 A | 12/1974 | Jackson | |
| 3,953,336 A | 4/1976 | Daigle | |
| 3,971,734 A | 7/1976 | Bush | |
| 4,003,838 A | 1/1977 | Jackson et al. | |
| 4,299,710 A | 11/1981 | Dupre et al. | |
| 4,620,596 A | 11/1986 | Mondshine | |
| 5,514,644 A | 5/1996 | Dobson | |
| 5,612,294 A | 3/1997 | Vaussard et al. | |
| 5,700,377 A * | 12/1997 | Cox ........................... | 210/724 |
| 5,728,654 A | 3/1998 | Dobson, Jr. et al. | |
| 5,783,527 A | 7/1998 | Dobson, Jr. et al. | |
| 5,789,352 A | 8/1998 | Carpenter et al. | |
| 6,001,158 A | 12/1999 | Elphingstone et al. | |
| 6,180,571 B1 | 1/2001 | Sifferman et al. | |
| 6,492,305 B2 | 12/2002 | Sifferman et al. | |
| 6,573,221 B2 | 6/2003 | Talashek et al. | |
| 6,609,578 B2 | 8/2003 | Patel et al. | |
| 2002/0092681 A1 | 7/2002 | Patel et al. | |

FOREIGN PATENT DOCUMENTS

| | | |
|---|---|---|
| EP | 0691454 | 1/1996 |
| EP | 0814232 | 12/1997 |
| GB | 1 481 991 | 8/1977 |
| GB | 1499034 | 1/1978 |
| GB | 1 549 378 | 8/1979 |
| GB | 2 221 940 A | 2/1990 |

OTHER PUBLICATIONS

Ecuadorian Patentability Report for SP-04-4942, dated Jul. 27, 2009.
Ecuadorian Office Action for Application No. SP-04-4942 dated Jul. 29, 2010.

* cited by examiner

*Primary Examiner* — Timothy J. Kugel
(74) *Attorney, Agent, or Firm* — Bachman & LaPointe, P.C.

(57) ABSTRACT

A drilling fluid includes a base fluid and a circulation loss reducing additive package having a polysaccharide, a cellulose derivative and a pH controlling component.

20 Claims, 6 Drawing Sheets

DRILLING FLUID WITH CIRCULATION LOSS REDUCING ADDITIVE PACKAGE

CROSS REFERENCE TO RELATED APPLICATIONS

This application is the U.S. Continuation Application of U.S. application Ser. No. 10/342,852 filed Jan. 15, 2003, now abandoned.

BACKGROUND OF THE INVENTION

The invention relates to drilling fluid and, more particularly, to drilling fluids including a circulation loss reducing additive package which is particularly useful in high permeability reservoirs and the like.

When drilling through highly permeable, unconsolidated or micro-fractured formations, for example while drilling wells to hydrocarbon-bearing subterranean formations and the like, fluid is circulated through the hole to lubricate the drill bit, remove cuttings from the bottom of the hole, control pressure within the hole and for other reasons.

Unfortunately, highly permeable, unconsolidated or micro-fractured formations allow flow of the drilling fluid to leave the hole, which is called lost circulation. This fluid loss into the formations through which the hole is being drilled results in extra cost due to the need for constantly replacing the fluid, and further can result in damage to potentially valuable and hydrocarbon bearing formations.

It is clear that the need remains, therefore, for drilling fluids that can be used in highly permeable, unconsolidated or micro-fractured formations and the like, without substantial circulation losses.

It is therefore the primary object of the present invention to provide such a drilling fluid.

Other objects and advantages of the present invention will appear hereinbelow.

SUMMARY OF THE INVENTION

In accordance with the present invention, the foregoing objects and advantages have been readily obtained.

According to the invention, a drilling fluid is provided which comprises a base fluid and a circulation loss reducing additive package comprising a polysaccharide, a cellulose derivative and a pH controlling component.

In further accordance with the invention, the additive package preferably also includes starches, bridging agents, anti-oxidants and biocides, as well as other additives which may be desirable for particular applications.

In still further accordance with the present invention, a circulation loss reducing additive package is provided comprising a polysaccharide, a cellulose derivative and a pH controlling component.

BRIEF DESCRIPTION OF THE DRAWINGS

A detailed description of preferred embodiments of the present invention follows, with reference to the attached drawings, wherein.

DETAILED DESCRIPTION

Figure 1:
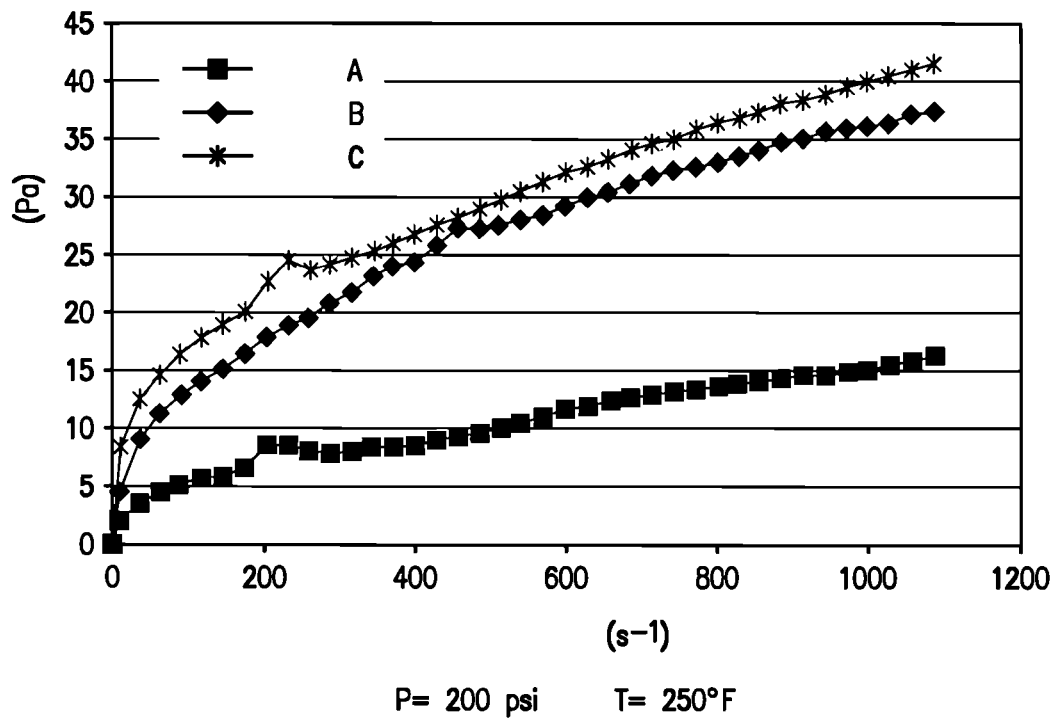
FIG. 1 schematically illustrates shear rate verses shear stress for fluids in accordance with the present invention after aging for sixteen hours at a temperature of 250° F.

The invention relates to a drilling fluid and, more particularly to a drilling fluid including an additive package for controlling circulation loss which is well suited for use in drilling through highly permeable, unconsolidated or micro-fractured formations and the like.

In accordance with the invention, a drilling fluid, preferably a water based drilling fluid, is provided including a circulation loss reducing additive package which includes a polysaccharide component which helps to improve rheology and reduce filtration losses, a cellulose derivative component which also serves to improve rheology and reduce filtration losses, and a pH controlling component. The polysaccharide component and cellulose derivative component combine to provide the fluid with excellent elastic properties.

In further accordance with the invention, it is preferred to also incorporate starches, bridging agents, anti-oxidants, biocides and other components into the additive package of the present invention as will be further described below and package containing all of these components provides particularly effective fluid loss control.

In accordance with the present invention, it has been found that drilling fluids containing the additive package in accordance with the present invention advantageously demonstrate much lower circulation losses when used in drilling through highly permeable, unconsolidated, micro-fractured and similar formations. Such drilling fluid formulations containing the additive package of the present invention further demonstrate desirable shear properties, filtrate loss, plastic viscosity and yield point, and apparent viscosity.

The polysaccharide component is preferably a non or low ionic charge polysaccharide.

In accordance with the invention, a preferred non-ionic polysaccharide is a non-ionic polysaccharide having double helix or triple helix configuration, or combinations thereof, in aqueous solutions. A particularly preferable non-ionic polysaccharide is scleroglucan which can be purified (CS11-Degussa) or not (Biovis or Actigum CS-Degussa), which, in combination with the cellulose derivative and bridging agent components, provide the fluid with improved viscoelastic, rheological and sealing properties Suitable low ionic charge polysaccharides include xanthan gum, which can be clarified or not, and further which can be acetylated or not. Commercial examples of suitable non and low ionic polysaccharides include Actigum CS, from Degussa, Xanvis, Diutam and NAX, all from CP Kelco. Of course, other non or low ionic charge polysaccharides can also be used in accordance with the broad scope of the present invention.

In addition, the additive in accordance with the present invention also preferably includes a cellulose derivative component which can preferably be provided in the form of hydroxypropyl cellulose, carboxymethyl hydroxyethyl cellulose, hydroxyethyl cellulose, hydrophobically modified cellulose and the like, preferably hydroxyethyl cellulose. This component of the additive package, combined with the polysaccharide component, advantageously serves to improve rheological and viscoelastic properties of the drilling fluid, and also serves to reduce filtration losses or losses of fluid into a high permeability, unconsolidated or micro-fractured formation.

In accordance with the present invention, the additive further preferably includes a pH controlling component or additive, and this pH controlling component can advantageously be selected from the group consisting of monoethanolamine, ethanolamine, magnesium oxide, triethanolamine, sodium hydroxide, sodium carbonate, potassium carbonate and combinations thereof. The pH controlling additive is preferably added so as to pH at desired levels, preferably up to about 12.

A further component of the additive package in accordance with the present invention may preferably be a starch or starch derivative, which advantageously serves to provide further filtrate volume control. Examples of suitable starch or starch derivative components include carboxymethyl starch, hydroxyethyl starch, hydroxypropyl starch, starches cross-linked with etherifying and/or esterifying agents and the like, preferably slightly cross-linked starches such as FL-7 Plus, M-I Drilling Fluids. These starches, starch derivatives and modified starches are collectively referred to herein as a starch component.

A bridging agent is preferable to include to achieve good filtration control and low fluid loss, and a particularly preferred bridging agent is calcium carbonate. Sized calcium carbonate, such as Milcarb from Baker Hughes Inteq, is particularly suitable for use in the package of the present invention. The size of the calcium carbonate particle is selected to avoid formation damage and also to control fluid loss. Although calcium carbonate serves mainly as a bridging agent, to control fluid loss into the reservoir, calcium carbonate also serves to increase density of the fluid as desired so as to provide a final fluid having the desired density.

A still further component which may be included in the additive package of the present invention is an antioxidant component, and suitable antioxidants include sodium bisulfite, sodium sulfite and the like, preferably sodium bisulfite. These components serve to protect the biopolymers used in the additive package and drilling fluid formulation from oxidation, and thereby help to maintain the molecular weight of the polymers relatively constant as desired.

A biocide component is also preferably incorporated into the additive package of the present invention. Suitable biocide components include isothiazolones, glutaraldehyde, quaternary amines and the like. The biocide component advantageously serves to avoid undesirable hydrolysis of biopolymers in the formulation by reducing oxidative and enzymatic degradation of same.

In accordance with the present invention, the fluid itself can advantageously be water-based, and thus the base fluid may be water. Of course, other base fluids can be used as well. However, water based fluids are preferable in that the cost of the base fluid is desirably low, and the additives perform as desired in a water base.

A drilling fluid containing a circulation reducing additive package according to the invention preferably includes at least about 0.05 ppb of polysaccharide component, at least about 0.05 ppb of cellulose derivative component, at least about 1.0 ppb of pH controlling component, at least about 0.05 ppb of starch component, at least about 20 ppb of bridging agent, at least about 1.0 ppb of antioxidant and at least about 0.05 ppb of biocide, all taken with respect to weight of the component per barrel of drilling fluid.

Table 1 below sets forth preferred ranges and specific values for amounts of the various components of a drilling fluid and drilling fluid additive in accordance with the present invention.

TABLE 1

|  | Preferred range | Preferred values |
| --- | --- | --- |
| Guar gum derivative (CMHPG) (ppb) | 0.05-5 | 2.36 |
| Hydroxyethylcellulose (HEC) (ppb) | 0.05-5 | 1.15 |
| Scleroglucan (ppb) | 0.05-4 | 2.00 |
| Xanthan gum (ppb) | 0.05-4 | 2.00 |
| Starch (ppb) | 0.05-5 | 4.00 |
| Biocide (ppb) | 0.05-0.50 | 0.02 |
| Sodium bisulfite (ppb) | 1.00-2.00 | 2.00 |
| Monoethanolamine (ppb) | 1.00-2.00 | 1.00 |
| Magnesium oxide (ppb) | 0.25-2.00 | 0.50 |
| Potassium chloride (ppb) | 0-7.00 | 7.00 |
| Calcium carbonate (ppb) | from at least about 20 to amount needed to reach weight | |
| Mineral oil (% v/v) (*) | 0-15 | 10 |
| Clay swelling inhibitor (% v/v) (**) | 0-3 | 2 |

Magnesium oxide may be used instead of the monoethanolamine as the pH controller agent
(*) Mineral oil is used to improve lubricity during drilling operation
(**) This additive is used only when drilling through reservoirs containing reactive shale.

Further examples of specific combinations of additive components include combinations such as those illustrated in Table 2 below.

TABLE 2

| Additive | Form. A | Form. B | Form. C | Form. D | Main function |
| --- | --- | --- | --- | --- | --- |
| Water (bbl) | 0.950 | 0.950 | 0.950 | 0.950 | Fluid base |
| Guar gum derivative (CMHPG) (ppb) | 2.36 | 0 | 2.36 | 0 | Viscosifier |
| Hydroxyethylcellulose (HEC) (ppb) | 0 | 2.36 | 0 | 1.15 | Filtration control agent |
| Sclerogulucan (ppb) | 2.00 | 2.00 | 0 | 2.00 | Main viscosifier |
| Xanthan gum (ppb) | 0 | 0 | 2.00 | 0 | Main viscosifier |
| Starch (ppb) | 4.00 | 4.00 | 4.00 | 4.00 | Filtration control agent |
| Biocide (ppb) | 0.20 | 0.20 | 0.20 | 0.20 | Biocide |
| Sodium bisulfite (ppb) | 2.00 | 2.00 | 2.00 | 2.00 | Antioxidant |
| Monoethanolamine (ppb) | 1.00 | 1.00 | 1.00 | 1.00 | Buffer agent |
| Potassium chloride (ppb) | 7.00 | 7.00 | 7.00 | 7.00 | Inhibitive agent (shales) |
| Calcium carbonate (ppb) | 60.0 | 60.00 | 60.00 | 60.00 | Bridging agent |

In accordance with the present invention, the drilling fluid can advantageously be prepared by sequentially mixing in the various additive components into the base fluid.

For example, assuming water is the base fluid, a starting volume of water may advantageously first be mixed with potassium chloride, then fumaric acid and then the hydroxyethylcellulose. After these components, then biocide materials can be added, followed by sodium bisulfides, scleroglucan, starch and finally calcium carbonate, each with a mixing time of between about 5 and about 20 minutes before addition of the next component.

Of course, other methods can be used to prepare the drilling fluid well within the scope of the present invention.

It has been found that fluids prepared in accordance with the present invention have excellent high pressure, high temperature rheological and viscoelastic properties. For example, a fluid prepared in accordance with the present invention was aged for sixteen hours at a temperature of about 250° F., and then subjected to HPHT rheological property testing, and the results are shown in FIG. 1. As shown, formulas A, B and C from Table 2 each provided excellent shear stress over shear rate, as desired.

Figure 2:
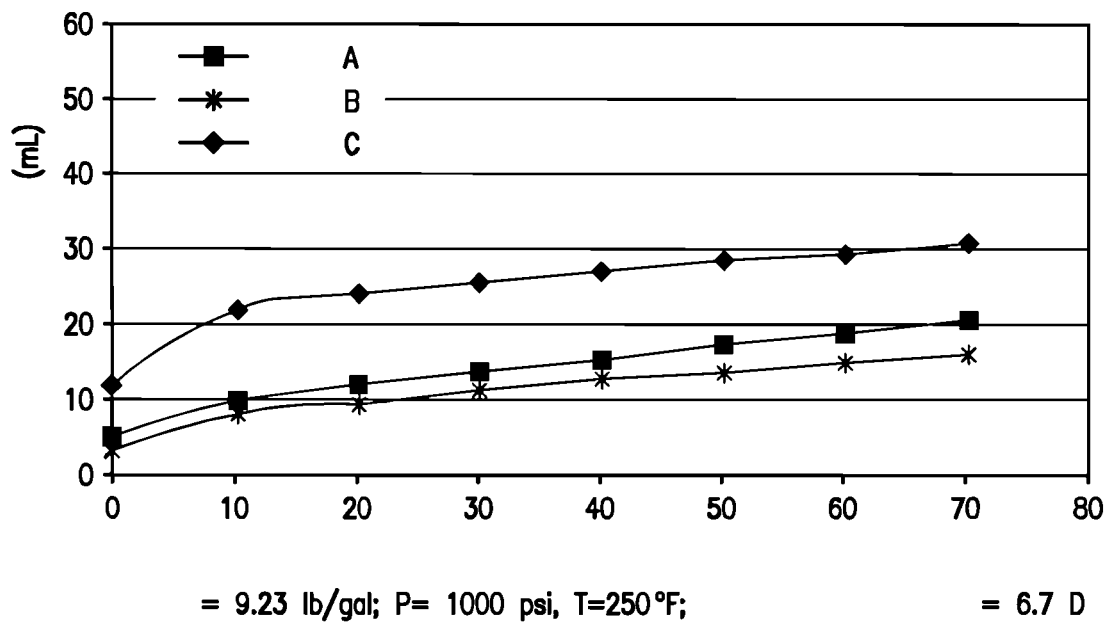
FIG. 2 graphically illustrates filtrate volume over time for drilling fluids in accordance with the present invention.

These same fluids, formulas A, B and C from Table 2, were then also evaluated for filtration properties after aging at 250° F. for a period of sixteen hours, and the results are shown in FIG. 2. As shown in this figure, although the filtrate volume loss was most ideal for formula B, and least ideal for formula C, the values obtained are nevertheless excellent, particularly as compared to conventional fluids.

EXAMPLE 1

In order to compare to conventional fluids, a series of fluids were prepared, with fluids 1-3 being prepared according to conventional or commercially available formulas, and with formula D being prepared in accordance with the present invention, the components of each of these fluids are shown below in Tables 3-6.

TABLE 3

Service company No. 1

| Additives | Concentration | Mixing time (min) |
| --- | --- | --- |
| Water | 0.976 bbl | — |
| Fumaric acid | 0.30 lb/bbl | 5 |
| HEC | 2 lb/bbl | 10 |
| Biocide | 0.20 lb/bbl | 5 |
| Sodium bisulfite | 2 lb/bbl | 5 |
| Starch | 4 lb/bbl | 15 |
| Calcium carbonate | 60 lb/bbl | 20 |

TABLE 4

Service company No. 2

| Additives | Concentration | Mixing time (min) |
| --- | --- | --- |
| Water | 0.971 bbl | — |
| Xanthan gum | 2 lb/bbl | 15 |
| Magnesium oxide | 2 lb/bbl | 5 |
| Biocide | 0.20 lb/bbl | 5 |
| Sodium bisulfite | 2 lb/bbl | 5 |
| Starch | 4 lb/bbl | 15 |
| Calcium carbonate | 60 lb/bbl | 20 |

TABLE 5

Service company No. 3

| Additives | Concentration | Mixing time (min) |
| --- | --- | --- |
| Water | 0.976 bbl | — |
| Polymer 1 | 5 lb/bbl | 15 |
| First activator | 1 lb/bbl | 15 |
| Second activator | 1 lb/bbl | 5 |
| Polymer 2 | 1 lb/bbl | 5 |
| Polymer 3 | 1 lb/bbl | 5 |
| Calcium carbonate | 60 lb/bbl | 20 |

TABLE 6

Formulation D

| Additives | Concentration | Mixing time (min) |
| --- | --- | --- |
| Water | 0.950 bbl | — |
| Potassium chloride | 7 lb bbl | 5 |
| Fumaric acid | 0.05 lb/bbl | 5 |
| HEC (hydroxethylcellulose) | 1.15 lb/bbl | 10 |
| Biocide | 0.20 lb/bbl | 5 |
| Sodium bisulfite | 2 lb/bbl | 5 |
| Scleroglucan | 2 lb/bbl | 10 |
| Starch | 4 lb/bbl | 15 |
| Calcium carbonate | 60 lb/bbl | 20 |

Figure 3:
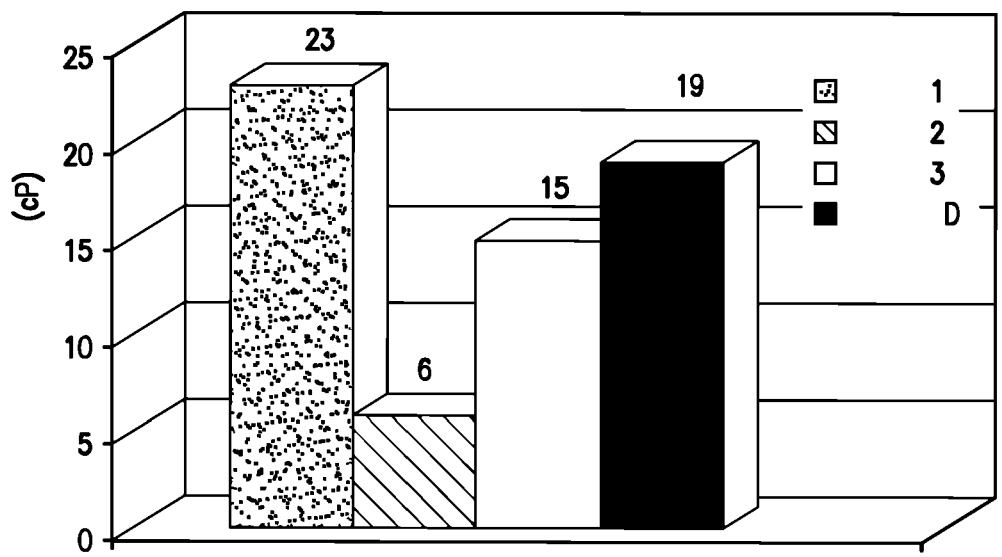
FIGS. 3 and 4 illustrate plastic viscosity and yield point for conventional drilling fluids and a drilling fluid in accordance with the present invention.
Figure 4:
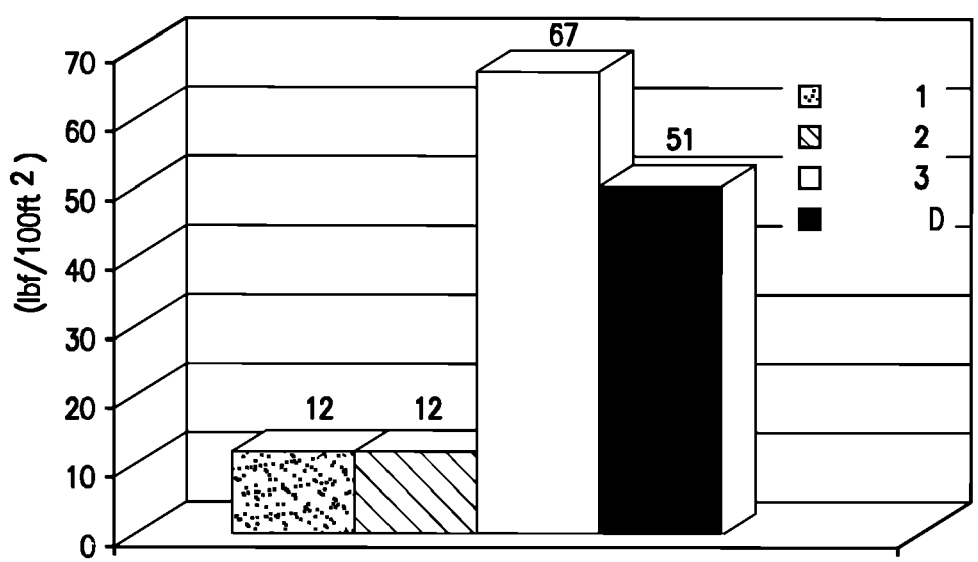

The plastic viscosity and yieldpoint were then determined, at 120° F., and after sixteen hours of aging at 250° F., and the results of this evaluation are shown in FIGS. 3 and 4. As shown, the fluid in accordance with the present invention provides excellent properties as desired. This is particularly advantageous when combined with the filtration loss control properties of the fluid of the present invention as well.

Figure 5:
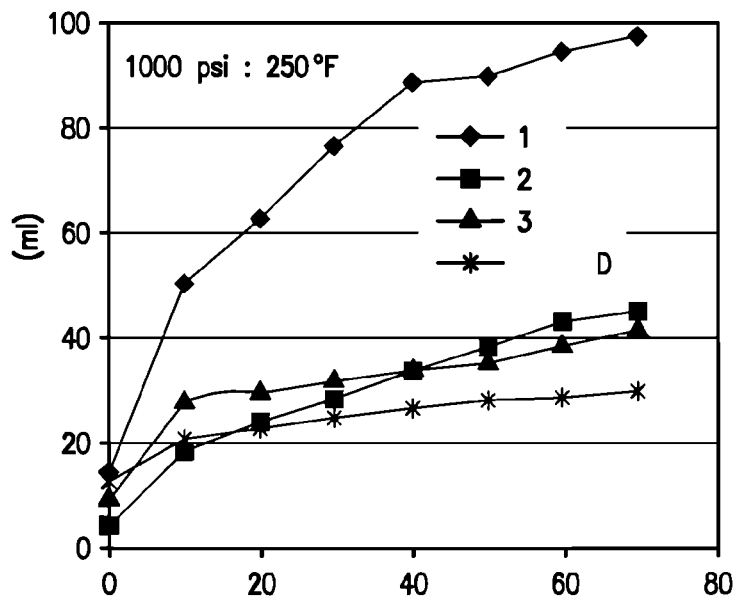
FIG. 5 graphically illustrates filtration loss over time for a fluid in accordance with the present invention and for conventional fluids.
Figure 6:
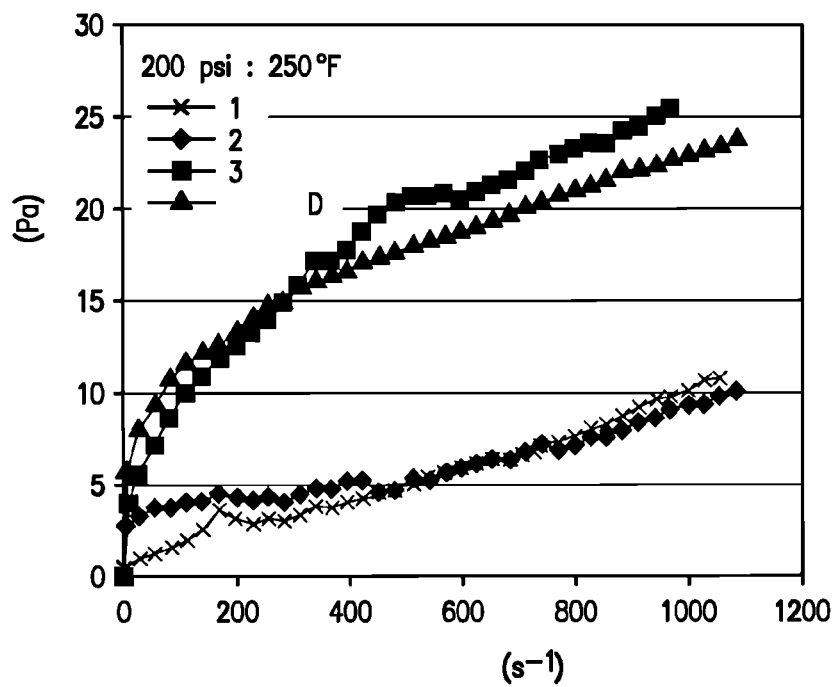
FIG. 6 graphically illustrates shear stress verses shear rate for a fluid in accordance with the present invention as compared to conventional fluids.

The filtration loss was then measured, after aging for sixteen hours at 250° F., for the conventional formulations and also the formulations in accordance with the present invention as described in connection with Tables 3-6 above. These formulations were evaluated and the results are shown in FIG. 5. As shown, the fluid of the present invention had the best characteristics in terms of low volume of filtration loss over time.

Fluid loss sealing tests were run with commercial formulations, that is, commercial fluids 1, 2 and 3, and formulation D in accordance with the present invention. After plotting filtrate volume as a function of time for all formulations, new curves were plotted dividing filtrate volume between area of filtration and extracting the square root of time, in order to determine the spurt loss values and Cw coefficients—intercepts and slopes of the curves, as indicated by filtration theory. Table 7 shows the data obtained.

TABLE 7

| Fluids | Cw (cm/min$^{1/2}$) | Spurt loss (mL/cm$^2$) |
| --- | --- | --- |
| Commercial fluid 1 | 0.324 | 0.558 |
| Commercial fluid 2 | 0.155 | 0.095 |
| Commercial fluid 3 | 0.109 | 0.406 |
| Form. D | 0.063 | 0.435 |

Table 7 shows that the fluid of the present invention has excellent properties in connection with Cw coefficients and spurt loss.

Next, the conventional fluids and fluid in accordance with the present invention were evaluated for shear stress verses shear rate after aging at a temperature of 250° F. for a period of sixteen hours. The results of this testing are shown in FIG.

6, and show excellent performance of the fluid in accordance with the present invention as compared to the commercial formulas, which is particularly advantageous in light of the filtration control qualities of the fluid of the present invention.

A further fluid was prepared in accordance with the present invention, and this formulation, designated Formulation E, was prepared as shown in Table 8 below.

TABLE 8

| Additives | Concentrations |
|---|---|
| Hydroxyethylcellulose | 3.0 (lb/bbl) |
| Scleroglucan | 2.0 (lb/bbl) |
| Starch | 2.5 (lb/bbl) |
| Biocide | 0.15 (lb/bbl) |
| Magnesium oxide | 0.5 (lb/bbl) |
| KCl | 2.0 (%) |
| CaCO$_3$ | 20.0 (lb/bbl) |
| Mineral oil | 10.0 (%) |
| Clay swelling inhibitor | 2.0 (%) |

Figure 7:
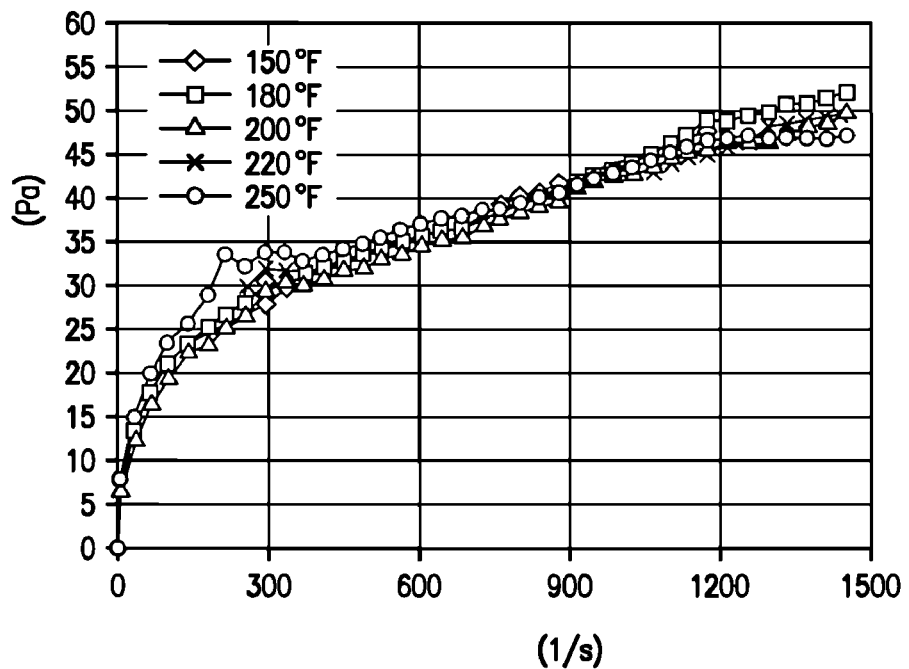
FIGS. 7 and 8 illustrate shear stress verses shear rate for a further fluid in accordance with the present invention, before and after aging for sixteen hours at a temperature of 200° F.
Figure 8:
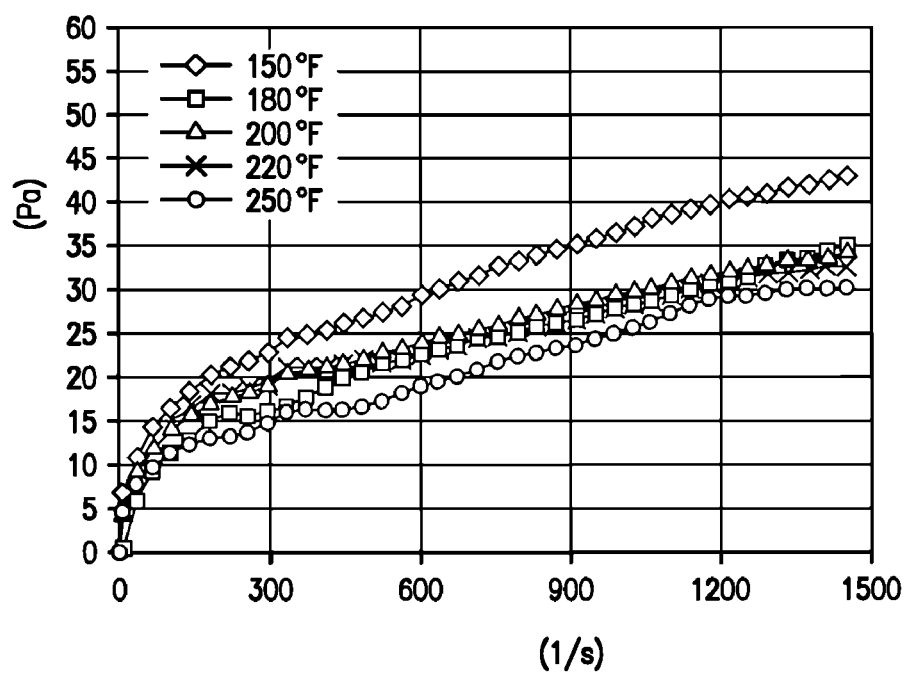

Formulation E was evaluated in a series of tests so as to determine shear stress verses shear rate for various temperatures after no aging, and after aging for sixteen hours at a temperature of 200° F. FIGS. 7 and 8 show the results of this testing, and show excellent results for the fluid of the present invention, both prior to and after aging.

The measurements obtained in order to show FIGS. 7 and 8 are based upon parameters derived from adjustment to a Bingham model (between 350 and 1450 l/s). Further, data was obtained from a Haake HPHT viscometer at a pressure of 300 psi and at different temperatures and this data is set forth in Table 9 below.

TABLE 9

| | No aging | | Aged at 200° F., 16 hours | |
|---|---|---|---|---|
| Temperature (° F.) | Plastic viscosity (cP) | Yield Point (lb/100 sq. ft.) | Plastic viscosity (cP) | Yield Point (lb/100 sq. ft.) |
| 150 | 20.6 | 48 | 17.9 | 51 |
| 180 | 20.9 | 46 | 15.2 | 26 |
| 200 | 18.1 | 50 | 13.1 | 34 |
| 220 | 15.4 | 55 | 12.6 | 31 |
| 250 | 14.4 | 57 | 15.7 | 20 |

Figure 9:
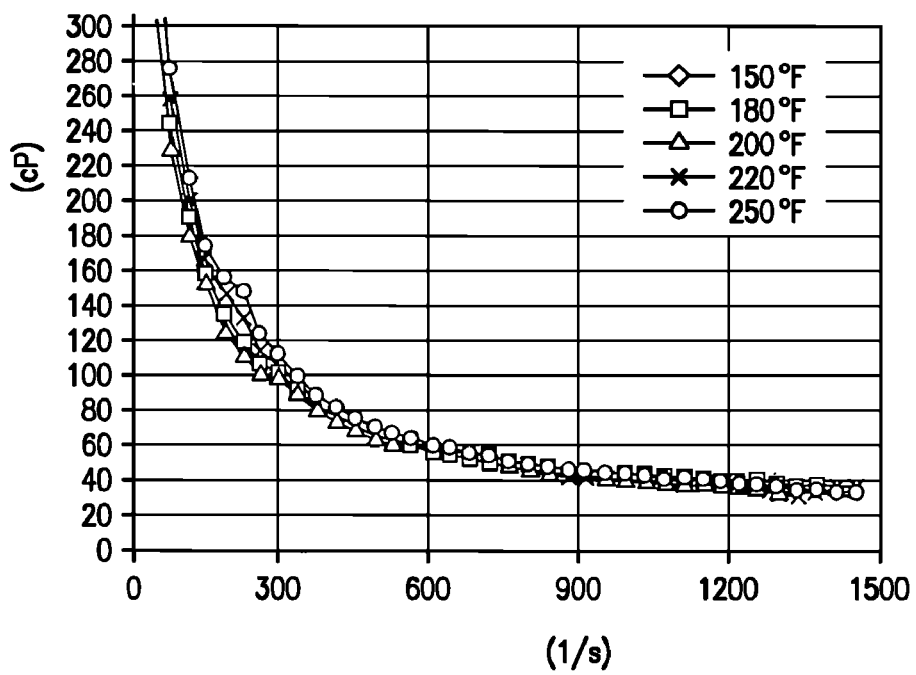
FIGS. 9 and 10 graphically illustrate apparent viscosity verses shear rate in accordance with the present invention, before aging and after aging for sixteen hours at a temperature of 200° F.
Figure 10:
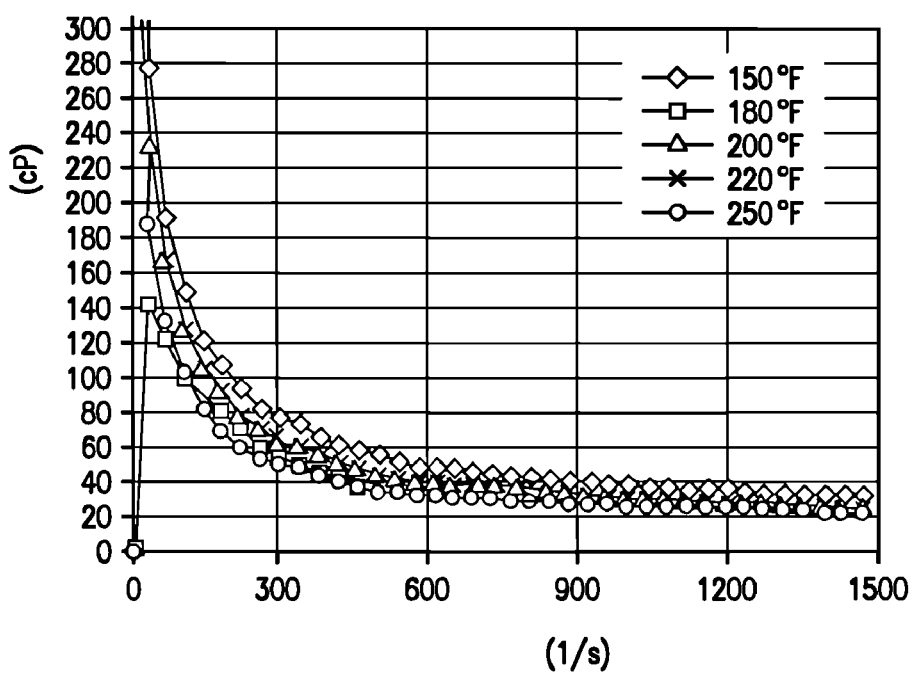

The properties of formulation E were further evaluated so as to determine apparent viscosity as a function of shear rate, and the results of this testing are shown in FIGS. 9 and 10. FIGS. 9 and 10 demonstrate that apparent viscosity is maintained as desired even after aging at 200° F., and that the apparent viscosity is not affected by increases in temperature in the range of 150° F.-250° F.

Permeability return tests were then carried out as follows.

A semi-dynamic test was run at a temperature of 150° F. and filtrate volume using a fluid prepared with formulation E was measured.

Figure 11:
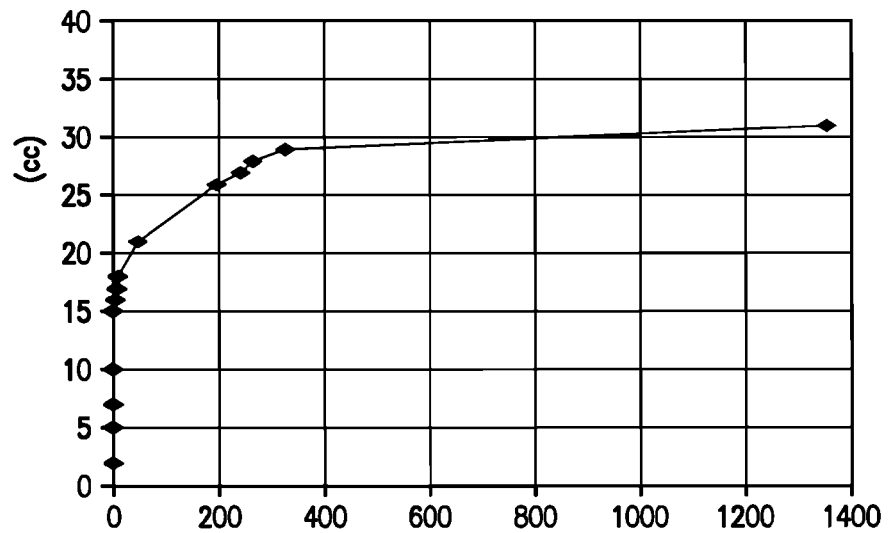
FIG. 11 graphically illustrates filtrate volume over time for a further fluid in accordance with the present invention.

The core conditions for carrying out this evaluation include a Berea core type, permeability of 500 mD, formation water containing approximately 2% wt. KCl, crude oil from a field in Western Venezuela, and the additive package of Formulation E. FIG. 11 shows the filtrate volume obtained with this formulation, and the test further shows an initial mobility of 1.04 mD/cP, a final mobility of 0.84 mD/cP, and a delta P of 1000 psi, and a formation damage of 18.87% had occurred.

Figure 12:
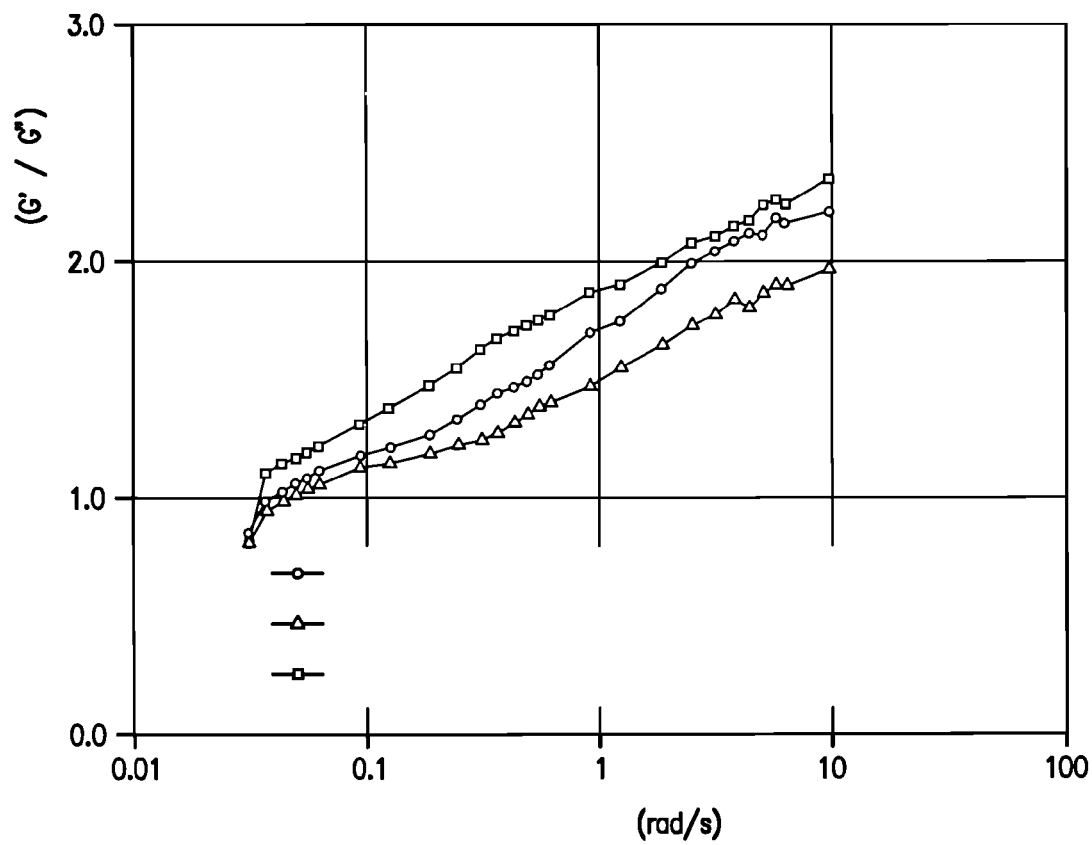
FIG. 12 illustrates storage modulus/loss ratio over a range of frequencies.

Formulation E in accordance with the present invention was also evaluated to determine storage and loss moduli as a function of frequency at a deformation located in the linear viscoelastic range, by using an oscillatory rheometer. Moduli of a high commercial viscoelastic fluid were also evaluated and compared to results obtained using Formulation E. Both formulations had been aged for 16 hours at 120° F. before taking of these measurements, and FIG. 12 shows the results in terms of the storage modulus/loss modulus (G'/G"), vs. frequency. FIG. 12 shows that Formulation E has G'/G" values that are comparable to those of the high performance commercial viscoelastic fluid, and both fluids have a high elastic component over a wide range of frequencies, since the G'/G" ratio is greater than unity. Such fluids are reported to provide better cuttings suspension and hole cleaning functions when used as drilling fluids. Thus, Formulation E provides a drilling fluid having desirable cutting suspension properties and sealing properties, and elasticity is comparable to high performance commercial viscoelastic fluids.

In addition, Formulation E was also subjected to this testing after having been aged at a temperature 150° F. for 16 hours, and even after such aging Formulation E holds elasticity over a wide range of frequencies as demonstrated by the ratio G'/G" which is still greater than unity.

A displacement test was conducted for a fluid similar to Formulation E, but not having the CaCO$_3$ additive. The test was conducted under severe conditions to maximize formation damage and to simulate fluid invasion. The core type was Berea, with a 500 mD permeability, and fluid conditions included 2% KCl, West Venezuela crude, and Formulation E in the form of an additive package according to the invention. The test was conducted under these conditions to maximize potential damage and simulate fluid invasion of the well.

This was done at a fluid injection pressure of 1500 psi, a fluid injection volume of about 5 pore volumes, and a fluid soaking time of about sixteen hours.

The results obtained include an initial mobility of 0.78 mD/cP, a final mobility of 0.59 mD/cP, a percent damage of 24.44, and a final delta P which was higher than an initial delta P.

The drilling fluid of the present invention was also field tested during the drilling of a horizontal reservoir in Western Venezuela. The fluid weight was 8.8 ppg, and estimated production was 800 bpd. Real production reached 1500 bpd, and no operational problems were observed during the entire course of the operation. Thus, field testing confirmed the excellent performance of the fluid of the present invention.

It should readily be appreciated that an additive package has been provided in accordance with the present invention which provide excellent results in terms of creating drilling fluid that have desirable properties for use in high permeability reservoirs.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A drilling fluid, comprising:
   a base fluid; and
   a circulation loss reducing additive package comprising a polysaccharide, a cellulose derivative and a pH controlling component, wherein said polysaccharide is scleroglucan.

2. The fluid of claim 1, wherein said additive package further comprises a starch component.

3. The fluid of claim 2, wherein said starch component is selected from the group consisting of carboxymethyl starch, hydroxyethyl starch, hydroxypropyl starch, starches cross-linked with etherifying agents, starches cross-linked with esterifying agents and combinations thereof.

4. The fluid of claim 1, wherein said additive package further comprises a bridging agent component.

5. The fluid of claim 4, wherein said bridging agent component is calcium carbonate.

6. The fluid of claim 1, wherein said additive package further comprises an antioxidant component.

7. The fluid of claim 6, wherein said antioxidant component is selected from the group consisting sodium bisulfite, sodium sulfite and combinations thereof.

8. The fluid of claim 6, wherein said antioxidant is sodium bisulfite.

9. The fluid of claim 1, wherein said additive package further comprises a biocide component.

10. The fluid of claim 9, wherein said biocide component is selected from the group consisting of isothiazolones, glutaraldehyde, quaternary amines and combinations thereof.

11. The fluid of claim 1, wherein said cellulose derivative is selected from the group consisting of hydroxypropyl cellulose, carboxymethyl hydroxyethyl cellulose, hydroxyethyl cellulose, hydrophobically modified cellulose, and combinations thereof.

12. The fluid of claim 1, wherein said cellulose derivative is hydroxyethyl cellulose.

13. The fluid of claim 1, wherein said pH controlling additive is selected from the group consisting of monoethanolamine, ethanolamine, magnesium oxide, triethanolamine, sodium hydroxide, sodium carbonate, potassium carbonate and combinations thereof.

14. The drilling fluid of claim 1, wherein the base fluid is water.

15. A circulation loss reducing additive package, comprising a polysaccharide, a cellulose derivative and a pH controlling component, wherein said polysaccharide is scleroglucan.

16. The circulation loss reducing additive package of claim 15, further comprising a starch, a bridging agent, an antioxidant and a biocide.

17. The circulation loss reducing additive package of claim 16, wherein said pH controlling additive is selected from the group consisting of monoethanolamine, ethanolamine, magnesium oxide, triethanolamine, sodium hydroxide, sodium carbonate, potassium carbonate and combinations thereof.

18. The circulation loss reducing additive package of claim 17, wherein said starch component is selected from the group consisting of carboxymethyl starch, hydroxyethyl starch, hydroxypropyl starch, starches cross-linked with etherifying agents, starches cross-linked with esterifying agents and combinations thereof, wherein said bridging agent is calcium carbonate, wherein said antioxidant component is selected from the group consisting of sodium bisulfite, sodium sulfite and combinations thereof and wherein said biocide component is selected from the group consisting of isothiazolones, glutaraldehyde, quaternary amines and combinations thereof.

19. A drilling fluid comprising:
    a base fluid;
    a circulation loss reducing additive package comprising scleroglucan in an amount of between 0.05 to 4.00 ppb, a cellulose derivative in an amount of between 0.05 to 5.00 ppb, a starch in an amount of between 0.05 to 5.00 ppb, a bridging agent in an amount of greater than 20 ppb, an antioxidant in an amount of between 1.00 to 2.00 ppb, a biocide in an amount of between 0.05 to 5.00 ppb, and a pH controlling component in an amount of between 1.00 to 2.00 ppb, wherein said starch component is selected from the group consisting of carboxymethyl starch, hydroxyethyl starch, hydroxypropyl starch, starches cross-linked with etherifying agents, starches cross-linked with esterifying agents and combinations thereof, wherein said bridging agent is calcium carbonate, wherein said antioxidant component is selected from the group consisting of sodium bisulfite, sodium sulfite and combinations thereof, wherein said biocide component is selected from the group consisting of isothiazolones, glutaraldehyde, quaternary amines and combinations thereof, and said pH controlling component is selected from the group consisting of monoethanolamine, ethanolamine, magnesium oxide, triethanolamine, sodium hydroxide, sodium carbonate, potassium carbonate and combinations thereof.

20. The drilling fluid of claim 19, wherein the base fluid is water.

* * * * *